United States Patent [19]

Adamek et al.

[11] 4,116,558

[45] Sep. 26, 1978

[54] DUPLEX SYSTEM AND METHOD FOR PRE-COLLATION COPIERS

[75] Inventors: John A. Adamek, Rochester; Richard T. Ziehm, Webster, both of N.Y.

[73] Assignee: Xerox Corporation, Stamford, Conn.

[21] Appl. No.: 767,012

[22] Filed: Feb. 9, 1977

[51] Int. Cl.[2] .......... G03B 27/32

[52] U.S. Cl. .......... 355/24

[58] Field of Search .......... 355/3 R, 8, 11, 23-26, 355/48-51; 271/DIG. 9, 3.1, 4, 9, 64, 245

[56] References Cited

U.S. PATENT DOCUMENTS

| | | | |
|---|---|---|---|
| 3,499,710 | 3/1970 | Sahley | 355/48 X |
| 3,615,129 | 10/1971 | Drawe et al. | 355/3 R |
| 3,841,754 | 10/1974 | Drexler et al. | 355/26 X |
| 3,856,295 | 12/1974 | Looney | 355/24 X |
| 3,999,852 | 12/1976 | Katayama et al. | 355/24 X |

*Primary Examiner*—Donald A. Griffin
*Attorney, Agent, or Firm*—James J. Ralabate; Clarence A. Green; William A. Henry

[57] ABSTRACT

A method and apparatus for providing duplex copies in pre-collated output copy sets from a set of documents recirculated in order by first copying only the even-ordered documents in the set once onto the first sides of substrates and transporting those copies to a buffer; then making individual copies in order of all the documents by alternately copying odd order documents on the reverse side of copies fed from the buffer while alternately copying even ordered documents onto copy substrates fed from a different copy substrate source, and transporting the copies made from the buffer to an output tray to create pre-collated sets while simultaneously transporting the copies from the other copy substrate source to the buffer to replace the copies fed therefrom; repeatedly individually copying all of the documents in the set in the latter manner by a number of document recirculations equal to one less than the total number of copy sets desired, and then, for a last copy set, making copies of only the odd ordered documents onto the reverse side of copies fed only from the buffer.

23 Claims, 3 Drawing Figures

DUPLEX SYSTEM AND METHOD FOR PRE-COLLATION COPIERS

BACKGROUND OF THE INVENTION

The present invention relates to pre-collation copying systems, and more particularly, to a duplex copying system which provides pre-collated duplex copy sheet sets.

When multiple copies are made from a multi-page set of original documents, the multi-page copies thereof are usually separated into separate copy sets in proper order, which is known as collation. For example, for ten copies of a five page document set, the copies should end up in ten separate copy sets, each copy set having one copy of pages 1 through 5 therein, in that order. For duplex copies, which require two of the document pages to be copied on opposite sides of the same copy sheet, copying with collation is more difficult. Once the copies are collated into copy sets they can then be stapled, bound, or otherwise finished. Such a copy set may be a copy of a multiple page memo, report, brief, magazine, book, etc.

The collation of multiple copy sets is known to be performable manually or automatically, in two general ways. In one way, which may be called "post-collation" the original document pages need only be handled once per copy. All of the desired number of copies are made in one copying operation from each document page. The copies thus come out of the reproducer in un-collated form, e.g., ten copies of page one together, followed by ten copies of page two, etc. The post-collation can then be provided in a number of well-known ways by mechanical sorters or collators, which separate the copy pages into separate copy set bins. Each copy set of a given document page must be individually placed in a separate bin. Then the copy of the next document page must be placed adjacent the preceding copy page in each bin until the complete set is completed in each bin.

The conventional post-collation process has a number of disadvantages. It requires considerable mechanical handling of the copy sheets, with consequent potential jams and copy sheet losses. The sorters or collators required considerable space, weight, and expense in order to provide a sufficiently large capacity. A conventional sorter or collator had a limited maximum capacity for the number of copy sets, equal only to the number of its bins. Thus, a single 20-bin sorter can only collate for 20 copies of a document set and additional copies would be uncollated unless recopying, with document recirculation, is provided, or unless "limitless" sorting is provided by switching between two or more bin sets and unloading one set of bins while the other sets is being filled. Also, the maximum size of the copy sets including the maximum number of copy sheets which can be in each copy set, is limited by the size of the individual bins.

The use of sorters or collators can be completely avoided by "pre-collation", a different way of performing output collation. In pre-collation the originals are serially recirculated, and one copy made per page per recirculation, by the number of times corresponding to the number of copies desired. Thus, the copy sheets come out of the reproducing apparatus individually, but already in pre-collated order, i.e., to immediately form sets. Thus, for the exemplary ten copies of a five-page book, one copy at a time would be made of each document page in this order: pages 1, 2, 3, 4, 5; 1, 2, 3, 4, 5, etc., repeated a total of ten times to make ten copy sets. However, for bi-directional pre-collation copying, to which the present invention could be related the copying sequence would be 1, 2, 3, 4, 5; 5, 4, 3, 2, 1; 1, 2, 3, 4, 5, etc., i.e. the copying of the document set is switched between forward and reverse serial order.

In pre-collation copying, all copies may be collated in one or two large output trays rather than in multiple bins. A relatively simple offsetting or staggering device may be provided for the output tray, if desired, to displace each copy set slightly from the next for set recognition and separate removal, e.g., U.S. Pat. No. 3,630,607 issued Dec. 28, 1971, to H. Korn et al.

In pre-collation copying, as in U.S. Pat. No. 3,963,345 to D. Stemmle and M. Silverberg which is incorporated herein by reference, there is no limit on the number of copy sets. Operator unloading of each set is not required. The size of each copy set is limited only by the document page capacity of the document recirculation system, i. e. the maximum document set size. Completed sets can be removed from the output tray while the others are being produced. A complete first set is produced from the first copies, and is immediately usable for proofing. On-line finishing can be provided in which each copy set is bound while the next set is being produced. Binding of the pages in each set can be by stapling, sticking, glueing, etc.

The embodiment disclosed herein utilizes a preferred pre-collation system in which document recirculation for multiple serial copying is provided while retaining document sheets on an elongated web wound in document retaining storage scrolls for minimizing document handling and maximizing document protection, where the web is wound and unwound between these document retaining scrolls for the pre-collation document copying. However, it will be appreciated that other pre-collation copying systems may also be utilized in the present invention, and therfore, it is not limited thereto. Examples of other bi-directional document movement copying systems which are included herein by reference are disclosed, for example, in U.S. Pat. No. 3,574,459, issued Apr. 13, 1971, to K. Hartwig and in U.S. patent application, Ser. No. 552,003, filed Feb. 24, 1975, by D. O. Kingsland, now U.S. Pat. No. 4,008,958, issued Feb. 22, 1977. Also, an optical system for scanning during reciprocal motion is disclosed in U.S. patent application filed Feb. 24, 1975, Ser. No.: 552,004, by Daniel S. Hoffman now U.S. Pat. No. 3,994,588, issued Nov. 30, 1976.

The concept of fully manual pre-collation copying is well-known, in which an operator sequentially manually makes single copies of the pages of the document set and re-copies the set by the number of copy sets desired. Some examples of previously known automatic pre-collation copying systems for document sheets are disclosed in U.S. Pat. No. 2,822,172, filed Feb. 4, 1958, by C. R. Mayo et al., German Pat. No. 1,128,295, Oct. 25, 1962, by H. Rankers; and U.S. Pat. Nos. 3,499,710, by L. W. Sahley, 3,536,320, by D. R. Derby, and 3,799,537, by H. W. Karp. In the latter, the documents are recirculated in individual carriers.

The present invention is directed to duplex copiers, i.e., copiers capable of copying on both sides or faces of a copy sheet as opposed to only single side or simplex copying. This has obvious advantages in savings in paper or other copy media. Duplexing may be carried out manually by re-stacking the copy sheets after copying on the first side, and then placing them in a sheet feeder supply tray for copying on the second side, or preferably it may be carried out automatically by, for example, the use of an auxiliary or duplex feeder tray such as in the Xerox "4000" copier in which all of the copies to be duplexed are copied on one side and are all stored and then fed out for copying of the second sides thereof. Some examples of duplex copying systems are disclosed in U.S. Pat. Nos. 3,615,129; 3,645,615; 3,841,754; 3,844,653; and the references cited therein. It will be appreciated that documents being duplex copied may themselves be either simplex or duplex, although the document handling required may differ. Thus, for simplex documents the odd and even documents pages are on alternate separate documents. In contrast, for duplex documents even document pages occur on opposite sides of the same document, so that duplex documents may be arranged with all even pages in adjacent order or all odd pages in adjacent order.

One of the problems which occurs with reproducing machines when they do both simplexing and duplexing is the generation of improperly collated sets of copy sheets in the output tray. For simplex unidirectional copying proper collation can be obtained by properly orienting an output path and output tray so that if sheets 1 through 10 are copied serially in the forward order, 1 through 10, they will appear face down in the output tray in that order. Numerous sorter/collator type devices have been devised which are capable at a simplex mode of operation of providing properly collated sets of copies. However, when one performs duplex copying from serially ordered simplex originals 1 through 10, the resultant copies appear in the output tray in the page order 2, 1; 4, 3; 6, 5; etc. Proper collation in this instance requires an inverter.

Examples of selectable simplex-duplex sorter/collators for maintaining collation are disclosed in U.S. Pat. No. 3,750,880 issued Aug. 7, 1973, to P. Petrovsky, et al.; 3,866,904, issued Feb. 18, 1975, to D. J. Stemmle; and 3,833,911, issued Sept. 3, 1974 to J. R. Caldwell and D. J. Stemmle. For bi-directional pre-collation copying the copy output sets may be handled as taught in U.S. Pat. No. 3,977,263 issued Dec. 14, 1976. The sheet deflector or inverter structures shown in these references may be incorporated herein as alternative embodiments of structures for providing the face-up versus face-down output selections for the present invention.

Exemplary embodiments of the present invention are shown and described hereinbelow as incorporated into otherwise conventional exemplary xerographic apparatus and processes. Accordingly, said xerographic apparatus and processes themselves will not be described in detail herein, since various printed publications, patents and publicly used machines are available which teach details thereof to those skilled in the art. This includes the use of flat platen scanning optics systems for copiers. Some examples of such optics systems are disclosed in U.S. Pats. Nos. 3,775,008, issued Nov. 27, 1973, and 3,832,057, issued Aug. 27, 1974, and in their cited references. Structures and teachings from these and all of the other references cited herein may be incorporated by reference in the specification, to the extent appropriate.

One object of the instant invention that follows from the foregoing is the accomplishment of duplex copying in a pre-collation copier.

It is a further object of the present invention to increase the effective overall copying rate and effectiveness of duplex copiers.

Another object of this invention is to reduce the number of document recirculations in collation duplex copying systems in order to achieve a certain number of sets.

It is yet another object of this invention to reduce duplex tray capacity requirements of present duplex copying systems and to otherwise improve automatic duplex copying systems.

A further object of this invention is to allow unlimited duplex copying from a document set.

A still further object of this invention is to provide an improved automatic duplex system which requires only one photoreceptor and one transfer of an image instead of two separate photoreceptor drums or belts and two separate transfers of an image.

Yet another object of this invention is to provide duplex copying without requiring the use of an inverter.

The foregoing and other objects of the present invention are accomplished by interleaving a buffer set of copy sheets with the regular set of copy sheets. The buffer set contains, e. g., sheets having the even numbered pages of a document on one side and the blank or unused side of these sheets being fed to the copier to receive, for example, the images of odd numbered pages in the document. Thereby, collated sets of copies containing images on both sides in logical order are obtained. The input document is the equivalent of a simplex document having pages arranged numerically.

BRIEF DESCRIPTION OF THE DRAWINGS

Further objects, features and advantages of the present invention pertain to the particular apparatus, steps, and details whereby the above-mentioned aspects of the invention are attained. Accordingly, the invention will be better understood by reference to the following description and to the drawings forming a part thereof.

DESCRIPTION OF THE PREFERRED EMBODIMENT

Figure 1:
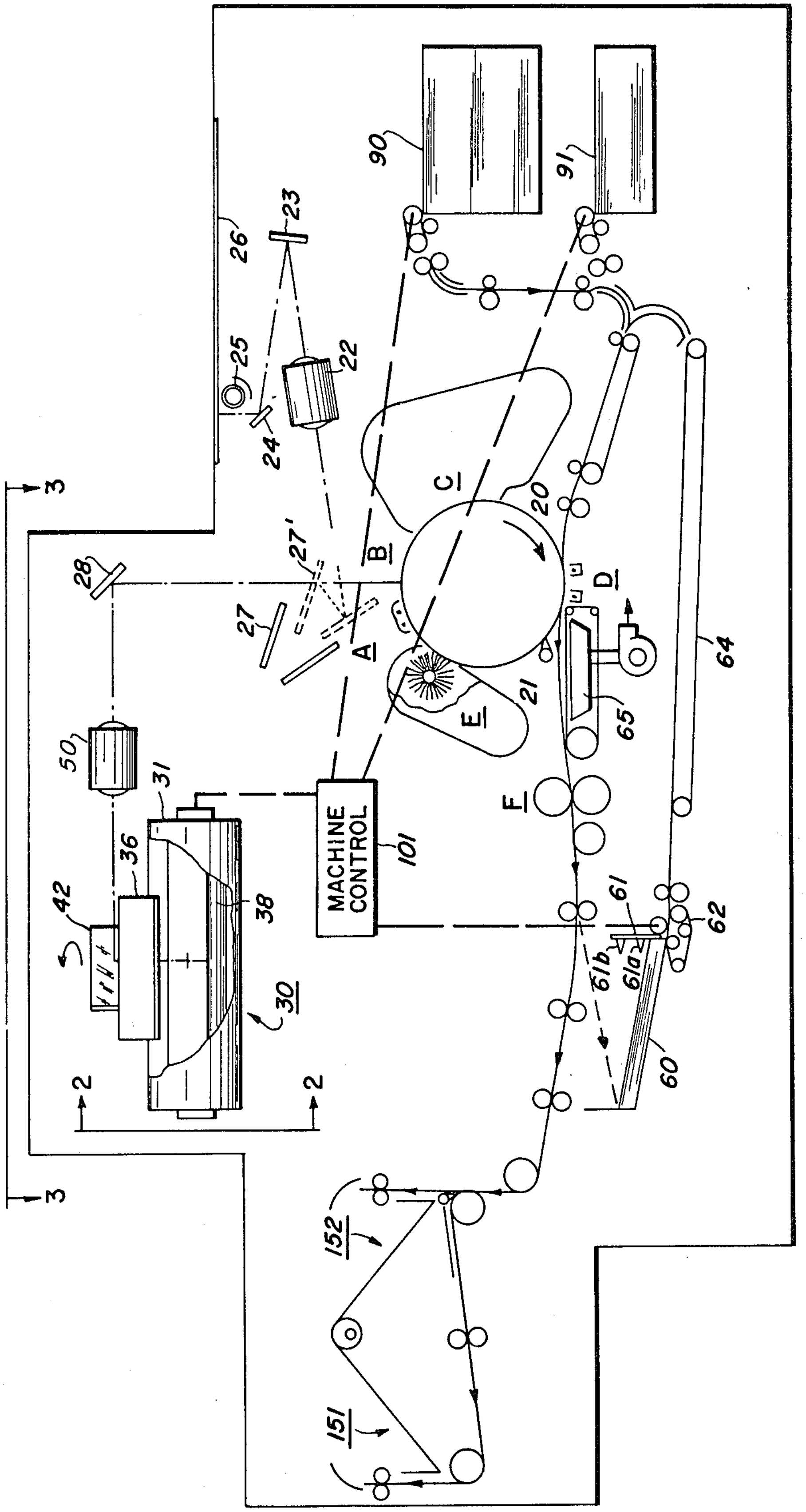
FIG. 1 is a side view of a bidirectional xerographic copying system with collated copy sheet output in accordance with the present invention.

Referring first to FIG. 1, there is shown a schematic of an exemplary reproduction machine 10 which will accomplish the objectives of the present invention. It includes a conventional photoconductive layer or light sensitive surface 21 on a conductive backing and formed in the shape of a drum which is mounted on a shaft journaled in a frame to rotate in the direction indicated by the arrow to cause the drum surface sequentially to pass a plurality of xerographic processing stations. It should be understood that belt photoreceptor and flash exposure could be used instead of the photoreceptor and exposure means shown in FIG. 1.

For purposes of the present disclosure, the several generally conventional xerographic processing stations in the path of movement of the drum surface may be described functionally as follows:

a charging station A at which the photoconductive layer of the xerographic drum is uniformly charged;

an exposure station B at which a light or radiation pattern of a document to be reproduced is projected onto the drum surface to dissipate the drum charges in the exposed areas thereof, thereby forming the latent electrostatic image of the copy to be reduced;

a developing station C where xerographic developer is applied to the photoconductive surface of the drum to render the latent image visible;

a transfer station D at which the xerographic developer image is electrostatically transferred from the drum surface to a transfer support material;

a drum cleaning station E at which the drum surface is brushed to remove residual toner particles remaining thereon after image transfer; and a fusing station F at which point the image is fused to the copy paper or support material.

For copying the xerographic apparatus 10 disclosed herein projects an image from the automatic web scroll document handling apparatus 30 described in the above-cited U.S. Pat. No. 3,963,345. It will be appreciated that it could otherwise be in the form of reel-to-reel microfiche, large document copier chain feeders or other document feeders including those which sequentially transport documents onto a platen glass and scan them using conventional optics. The document images are projected through lens 50 down from mirror 28 of FIG. 1 onto the photoreceptor 20. The image is developed on the photoreceptor surface 21 and rotated clockwise to a transfer station D. Copy sheets coming from either the main copy sheet feeding tray 90 or the auxiliary sheet feeding tray 91 are fed by a series of sheet feeding rollers to the transfer station D in order to accept the developed image from the photoreceptor drum 20 at the transfer station D. Vacuum stripper means 65 strips the paper from the photoreceptor 20 and transports it toward fuser F so that the image can be fused onto the copy sheet. Thereafter, the copy sheet is transported either to duplex tray 60, or to an output sheet tray 151 or 152. For simplex copies, the duplex tray 60 is not utilized. Documents can be imaged in the present invention either from the ADH or from platen 26.

For unidirectional document copying, all of the sets will be in one output tray. The same output tray 151 is used whether the copies are simplex or duplex. Collation occurs without an inverter. For bi-directional copying, alternate sets are alternately placed in trays 151 and 152. The forward order copies go into tray 151 and the reverse order copies go into tray 152.

Figure 2:
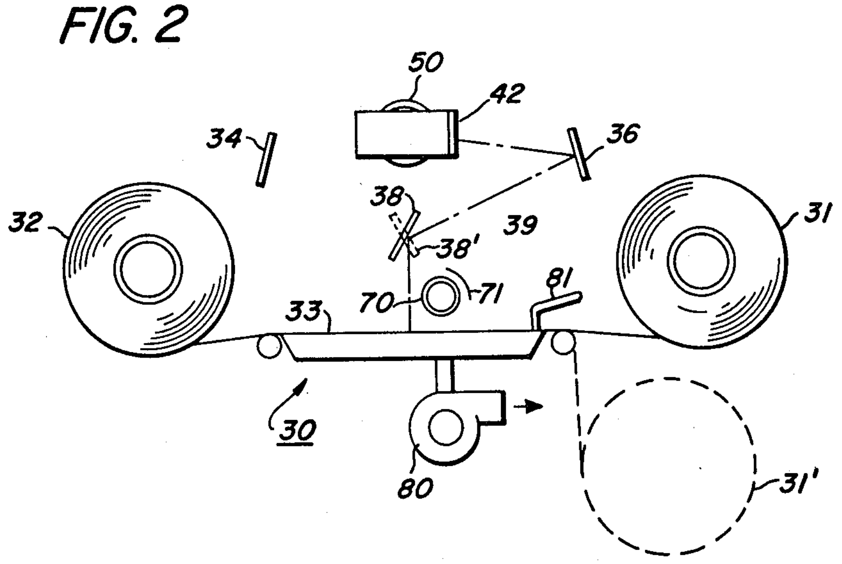
FIG. 2 is a side view taken along line 2—2 of the automatic document handling apparatus shown partly cut away in FIG. 1.

As shown in FIG. 2, documents are loaded by being placed onto web 33 against registration means 81 while scroll 31' is in the load/unload position. As the documents are moved by the automatic document handler, they are exposed by light directly from exposure lamp means 70 and reflected through reflector means 71 off the document into a bidirectional optical system for projection of the document image onto photoreceptor 20. Each sheet is conveyed past exposure means 70 and reflector means 71 and wound onto scroll means 32 after scroll means 31 has been moved into recirculate position. Subsequently, scroll means 32 is reversed in direction toward scroll means 31 to allow re-exposure of documents wound thereon in a reverse scan mode.

For the first exposure of the documents on the web, only even numbered documents are imaged, i. e., documents located in the 2, 4, 6, 8, etc. positions on the web 33. Depending on whether unidirectional or bidirectional copying is desired, the buffer set is a one set or two set buffer respectively. For unidirectional copying a fast reverse rewind is accomplished and only one buffer set is required. For bidirectional copying the even numbered documents are also imaged during reverse movement of the web to create two buffer sets, one in ascending order (2, 4, 6 . . . ) and one in descending order (8, 6, 4, 2). In either case, copies made from the exposure of the even numbered documents are fused at station F and continued in transportation on a conventional conveyor system into the top of the duplex buffer tray means 60.

Buffer tray 60 could be vertical or at any angle as long as sheets come in one side and go out the opposite side.

For bidirectional copying set separators 61*a* and 61*b* of separator 61 are employed within the duplex buffer set tray in order to separate more than one set of evens that are to be placed in the tray and also to simplify job recovery. A normal force applicator (not shown) can also be used to insure proper feeding of the sheets from the bottom of the duplex storage tray. If one desires, the normal force applicator and set separator that separates the first set of evens from succeeding sets can be one and the same such as 61*a*. On succeeding passes of the automatic document handler (hereinafter referred to as ADH) forward and reverse, all documents are imaged with copy substrates being fed from the copy sheet tray 90 to the transfer station D alternately with copy sheets from duplex storage tray 60. The copy sheets or final support material from primary copy sheet tray 90 receive images of even positioned documents in the ADH and are fed into the top of duplex storage tray 60 while copy sheets that are fed from the duplex tray alternate with the sheets fed from the primary copy sheet tray and receive images on the reverse side thereof of odd positioned documents in the ADH and are fed to output station 151 for copy sets made on the forward pass or 152 for copy sets made on the reverse pass so that once a completed collated set of documents have been collected in the output station they may be stapled and sidestacked or staggered and they will still read in consecutive ascending order (1, 2, 3, 4, 5, etc. . . ). On the last pass of web 33 past the exposure station 70 only odd numbered or positioned documents 90 are imaged. The images are then copied on the back of copies previously made from even numbered documents that are fed from buffer storage tray 60. This process empties the buffer tray and presents the final set of duplexed copies to the output station. However, if a two set buffer is used, odd numbered documents (only) are imaged on both of the final forward and reverse scans of web 33 in order to make complete duplexed copies of the two sets of evens located in the duplex tray and finish the duplex run of collated sets with an empty duplex tray.

It should be understood that odd numbered documents could be imaged on the first pass of the ADH, however, to do so would require an extra pass of the last copy sheet through the transfer station without putting an image on the even side thereof in the copying of an odd numbered document set, e. g. a set of 5 documents. Alternatively, if you did not make an extra pass, an inverter would have to be used to insure proper orientation of the last odd copy sheet. One pitch on the imaging member would in most systems also then have to be skipped in order to provide time for the last sheet to be properly oriented in the output tray. The aforementioned requirements are eliminated by imaging even numbered documents first, regardless of whether a document set comprises an odd or even number of documents.

Duplexed copies can be obtained from duplexed originals in a number of ways. One method would include copying the otherwise hidden sides of documents and then interleaving these copies with non-hidden sides of original documents to form a full simplexed set of documents and then proceed to create duplex copies from simplex documents as previously described. Another way to duplex/duplex would include copying duplexed originals by flipping each original over as a copy is made. Another way is to unload, invert and reload the duplex documents for such circulation. A further way is to copy all even sides of all sets and store them, then flip all documents over and copy all odd sides.

In reference to FIG. 2, an optical system for scanning documents in both directions of relative reciprocal motion between the document and the optical system is shown. The document is first scanned in one direction, then the image orientation is rotated 180° about the axis of propagation for scanning in the reverse direction. Properly oriented images are thus projected onto photoreceptor 20 and move in the same direction during both directions of scan, i. e. moving in the same direction as the photoreceptor surface in both cases without reversing the photoreceptor movement. This is more fully disclosed in U.S. patent application, Ser. No. 552,003 filed Feb. 24, 1975.

Referring now to the disclosed method and apparatus to provide duplex copies in pre-collated output copy sets, it will be seen that it reduces the number of original document recirculations required by one-half (less 1) by eliminating the requirement for the skipping of alternate pages on all document recirculations for copying, except the first and last. This general duplex copying concept may be generally applicable to most pre-collation copying systems. In the particular automatic document handler 30 disclosed herein, this concept reduces the frequency of ADH belt movement for duplex by almost one-half and increases the effective duplex copy output rate of the overall copier.

The duplex system disclosed herein has a copy sequence for the ADH belt 33 which is the same as for ADH simplex/simplex copying except for the first and last ADH belt passes (document recirculations). No operator separation of document pages into two sets (of odd and even pages) is required. Further, the duplex tray 60 capacity need only be that of the maximum number of pages in the document set, yet the number of duplex copies which can be made from the document set is unlimited.

This duplex copying scheme may be described as follows:

(1) In the first ADH pass (document circulation) all of the documents are moved once past the ADH document imaging station, but only alternate pages are copied, i. e., only the even or odd numbered pages. If only even numbered documents are copied on the first pass, and the documents are scanned in increasing or forward serial order, i. e. 1, 2, 3, etc., and if output copies are delivered face down, no copy inverter is required for either simplex or duplex copies. Thus, it is preferable to copy the even numbered pages on the first pass. The alternate odd pages to be skipped can be skipped by inhibiting the copy sheet tray feeder or registration gate for those pages, and turning off the document exposure lamp and/or leaving the "inter-document erase lamp" on, or providing another flood lamp, or other means for preventing the copying of these pages. The copy sheets made from the document pages which are copied on this first pass are all fed serially into the top or input side of duplex sheet output tray 60.

(2) For unidirectional copying, on the second, and each succeeding, document recirculation (e. g., the next ADH web scan wind) the copying sequence differs completely except for the last circulation. All of the document pages are imaged and copied. The alternate pages which were skipped in the first document copying circulation are now copied onto copy sheets fed from the bottom of the duplex tray 60, not fed from a clean copy sheet tray 90 or 91. Thus, copies of adjacent document pages are printed on the reverse side of the previously printed pages, in sequence. These completed duplexed pages are then fed out into the copy tray 151 or 152 where they form a collated set, (an inverter may be required to invert the sheets prior to reaching the duplex tray, depending on the direction, or page order, of document scan and depending on whether or not the duplex copy sheet output is face up or face down). However, in the same document recirculation, those documents which had been copied on the first document circulation are now copied onto clean copy sheets fed from a copy sheet tray 90 or 91, and, after the image is transferred to the first side thereof, are fed into the top or input side of the duplex tray 60. Thus, as all of the document pages are imaged serially one copy sheet is fed from the bottom of the duplex storage tray, then the next copy sheet is fed from the copy sheet tray, etc., alternating the feeding between the two trays. (There may, of course, be other copy sheet sources, such as a roll and chopper supply). The duplex tray acts as a "buffer set" for the copy sheets which have been copied only on one side since copy sheets are being approximately fed into the top and fed out of the bottom of the duplex tray at the same rate. The term buffer set is intended to include any means for temporarily retaining the buffer set of simplexed copies in order; for example, a plurality of bins, web scroll devices or belt conveyors.

(3) Upon reaching the last document circulation, for producing the last copy set, only alternate document pages are copied, similar to the first circulation described above, except that the alternate pages skipped then are now copied. On this last pass the copy sheets are fed only from the buffer set in the duplex tray, with the resultant duplexed copies being fed out to the output tray as the final set. This empties the duplex tray, and no copy sheets are wasted.

A programmable machine controller 101 is used to control the operation of xerographic reproduction in either the simplex or duplex modes of copier 10, such as, the controller disclosed in U.S. Pat. No. 3,940,210 which is incorporated herein by reference. A machine controller such as the one described in U.S. patent application, Ser. No. 677,473, filed Apr. 15, 1976, incorporated herein by reference could also be used.

It will be noted that with the above-described method and automatic apparatus, no intermediate recirculating back or reversal in direction of scanning is required, so that the ADH belt motion can be smooth and continuous, with reduced belt and belt drive wear. Except for the first and last document passes there is no skipping of documents and the copying rate can be the same for duplex as for simplex. For ten duplex copy sets only 11 document recirculations are required, not twenty.

Figure 3:
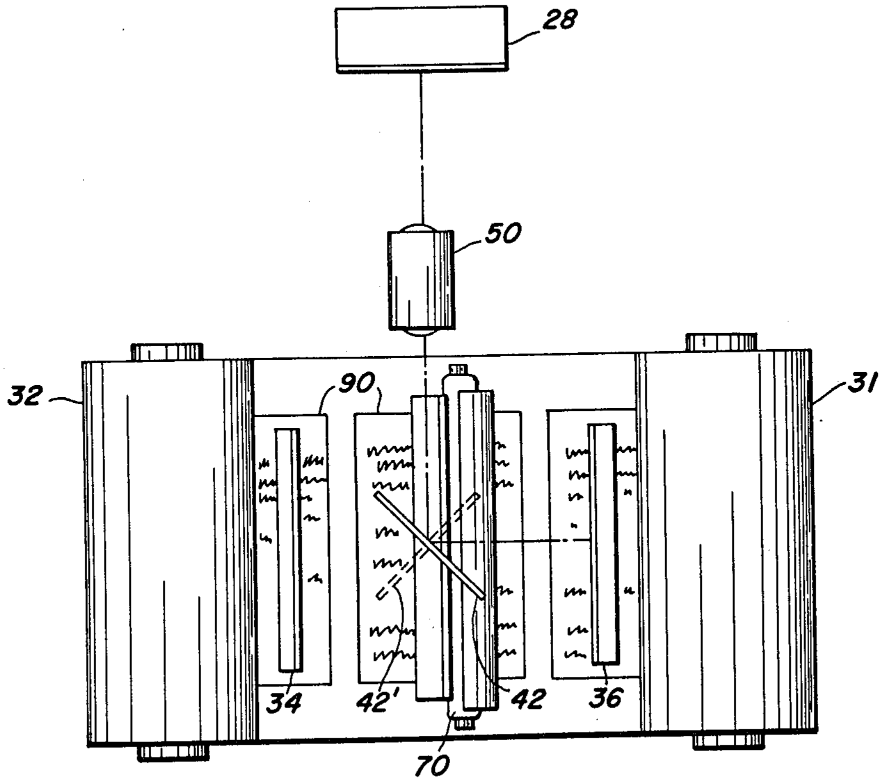
FIG. 3 is a top view taken along line 3—3 of FIG. 1.

In further reference to the optical system, the first reflector 38 is located along the optical axis 39 and is mounted for rotation or translation between the first position shown in solid line in FIG. 2 and a second position shown in phantom line 38'. In its first position, reflector 38 deflects optical axis 39 toward one stationary reflector 36 which in turn deflects the image toward rotatable deflector 42 which in turn deflects the image through lens 50 to angled reflector 28 where the image is deflected down to the photoreceptor 20. This described path of an image is in reference to a forward scan of the ADH 30. In a reverse scan mode the bidirectional optics would shift reflector 38 to position 38' which would cause an image to be deflected to the stationary reflector 34 which would in turn deflect the image to reflector 42 which has been rotated to position 42' as shown in FIG. 3, which then deflects the image into lens 50 and over to reflector 28 which in turn deflects the image down to photoreceptor 20 with a resultant properly oriented image projected onto the imaging surface 20 moving in the same direction during both directions of scan.

Depending on whether the ADH is used or platen scanning is used dual mirror unit 27 is moved to one of two positions. If the ADH is used as the projection system, mirror unit 27 is moved out of the optical path. If platen scan optics is used, mirror unit 27 is moved into the position 27' shown in phantom in FIG. 1. This unit is more fully described in U.S. Pat. No. 3,947,188, filed Nov. 11, 1974, Ser. No. 522,665. If platen scan optics is used an original is placed stationarily on platen 26 and exposed with scanning lamp 25. That image is projected to full rate mirror 24 and deflected to half rate mirror 23 through lens 22 and the two reflectors at 27' down to photoreceptor 20. Although stationary platen scanning optics are shown here, one could substitute conventional moving platen stationary optics if such was desired.

In reference to the overall disclosure, an improved duplex reproduction system for producing pre-collated duplex copy sets from original document page images is shown including a bidirectional optical scanning system 30 within a copier 10 and a processor 20 for placing a document page image onto a first side and second side of a copy sheet. The document page image feeding means 30 separately passes original document page images in seriatim to a copy station of the processor in a pre-selected number of passes that includes a first and last pass. The term "page image" used herein is intended to also encompass images generated by computers and lasers as well as conventional documents. An inhibiting means is used for not copying alternate document page images on the first and last passes of the document page images as they are presented by the document feeding means. Copy sheet feeding means 90 supplies sheets with front and back sides to transfer station D to receive images from the photoreceptor 20 on all but the last pass of the document recirculation means. Conventional conveyor means 65 is disclosed for receiving copy sheets that have images placed on one side thereof by the processor and transporting them with the other side thereof not imaged into a duplex stacking means. The sheets in the duplex stacking means which have been alternately imaged from the first pass of the document feeding means on the back side thereof forms a buffer set. A copy sheet feeding means 62 of the type disclosed in U.S. Pat. No. 3,934,869 to Erwin J. Strobel, Jr., patented Jan. 27, 1976, and incorporated herein by reference, is associated with the duplex stacking means 60 and feeds one side imaged copy sheets from the buffer set only after a second pass of the document page images by the document feeding means to the processor, to be imaged on the other side or front side alternately with sheets being fed to the processor from copy sheet feeding means 90 to be imaged on one side. The sheets fed from the buffer means are continued from the processor to an output means 151 or 152 face up or face down after the other side is imaged in pre-collated order while the copy sheets fed from the copy sheet feeding means 90 are continued from transfer station D by conventional conveying means into duplex stacking means 60 to replace the first buffer set in the duplex stacking means. The inhibiting means includes means to allow feeding of copy sheets on the last pass of the document page image feeding means only from the duplex stacking means by sheet feeding means 62 whereby the buffer set is imaged on the other side thereof and transported to output means 151 or 152 in order to complete the pre-collated sets originally dialed into the machine.

In conclusion, an apparatus is disclosed for selectively copying sets of sheets from a pre-collated set of page images that include both odd and even type page images. The term odd or even type page images is intended to mean images placed in the odd position on a copy such as 1, 3, 5, 7, etc. and even type page images is intended to means images placed in even positions on a copy such as, 2, 4, 6, etc. The present apparatus includes means for serially presenting the pre-collated page images for copying and a selector means that selects only odd or even type page images presented for copying. A collection means is disclosed for collecting sets of sheets corresponding to the odd or even type page images.

In addition to the method and apparatus disclosed above, other modifications and/or additions, such as using another document recirculation means disclosed in the previously cited patents will readily appear to those skilled in the art upon reading this disclosure and are intended to be encompassed within the invention disclosed and claimed herein.

What is claimed is:

1. A method of reproducing pre-collated sets of sheets of page images comprising the steps of:

(a) providing a means for forming a page image on a sheet of final support material;

(b) presenting serially to said imaging means a plurality of page images arranged in a desired sequential order wherein page images arranged at an odd position in said order comprise odd type page images and page images arranged at an even position in said order comprise even type page images;

(c) providing first means for feeding first sheets of final support material from a first supply thereof;

(d) providing second means for feeding second sheets of final support material from a second supply thereof; and (e) actuating in response to the presentation of a page image of one of said odd or even types to said imaging means said first feeding means to feed a first sheet of final support material to said imaging means for forming an image of one type of page image thereon and actuating a second feeding means in response to the presentation of a page image of the other of said odd or even types to said imaging means to feed a second sheet of final support material to said imaging means for forming an image thereon of said other type page image while continuing to feed sheets from said first feeding means.

2. The method of claim 1, further including the step of:

forwarding said first sheets after images have been formed on a first side thereof to said second feeding means in an arrangement whereby said first sheets may be fed to said imaging means to have an image formed on the opposite side thereof, said second sheets comprising said first sheets having an image on a first side thereof, whereby pre-collated duplexed sets of copy sheets are provided.

3. A method of automatically reproducing on a reproduction machine from original page images multiple collated sets of two-sided copy substrates having front and back sides comprising:

(a) providing in collated fashion a set of back side information on copy substrates in a buffer storage means;

(b) presenting a collated fashion at least one set of back side and front side page image formation, placing the back side information onto copy substrates thereby making additional one-sided copies and feeding said substrates to the buffer storage means while simultaneously placing the front side information onto the front side of copy substrates fed from the buffer storage means in collated fashion thereby making two-sided copy substrates; and (c) then providing in collated fashion a set of front side information onto the front side of the one-sided copy substrates remaining in the buffer storage means to make the final set of two-sided copy substrates.

4. A method of automatically reproducing on a reproduction machine from original page images multiple collated sets of two sided copies having front and back sides, said machine having at least one collated set of back side information on copy substrates in a buffer storage means:

(a) reproducing from the original page images in collated fashion at least one set of front and back side information, placing the back side information onto copy substrates thereby making additional one-sided copies and feeding said substrates to the buffer storage means while simultaneously placing the front side information onto the front side of substrates fed from the buffer storage means in collated fashion thereby making two-sided copies and feeding said two-sided copies out of the reproduction machine; and (b) then reproducing in collated fashion at least one set of front side information of the original page images onto the front side of the one-sided copies remaining in the buffer storage means to make the final set of two-sided copies.

5. A method of automatically reproducing on a reproduction machine from original page images multiple collated sets of two-sided copies having front and back sides comprising:

(a) maintaining a collated set of copy substrates in a buffer storage means at least until the final set of two-sided copies is made;

(b) reproducing from the original page images in collated fashion at least one set of front and back sided information, placing the front side information onto copy substrates thereby making additional one-sided copies and feeding said substrates to the buffer storage means while simultaneously placing the back sided information onto the back side of substrates fed from the buffer storage means in collated fashion thereby making two-sided copies;

(c) then reproducing in collated fashion a set of back sided information of the original page images onto the back side of the one-sided copies remaining in the buffer storage means to make the final set of two-sided copies.

6. A method for copying images from page images in sequential odd and even numbered order onto both sides of copy sheets in a pre-collated order comprising the steps of:

(a) providing an imaging station;

(b) feeding said page images past said imaging station on a number of passes including a first, second and last pass;

(c) imaging only the even numbered page images during said first and second of said number of passes;

(d) feeding sheets from a first copy sheet source to receive said images on one side thereof;

(e) directing said imaged copy sheets to a duplex stacking position;

(f) feeding said page images past said imaging station on a third and subsequent number of passes;

(g) imaging on said third and subsequent passes all of said page images;

(h) feeding alternately on said third and subsequent passes copy sheets from said duplex position and from said copy sheet source to receive said images whereby sheets fed from said duplex position receive said images on the other side thereof and are conveyed to a tray in order to form pre-collated sets and sheets fed from said copy sheet source receives said images and are conveyed to said duplex position to await feeding from said duplex position;

(i) inhibiting said imaging during the last two passes of said page images over said imaging station in order to image only odd numbered page images; and (j) copying the documents imaged on the last two passes over said imaging station only on sheets from from said duplexing position.

7. A method of making duplex copy sets from a set of page images arranged in sequentially numbered odd-even order comprising the steps of:

(a) making copies of even numbered page images in said set on one side thereof;

(b) transporting of even numbered page image copies to a buffer, (c) making copies of all originals, (d) making copies on the other side of copies fed from the buffer while alternately making copies not fed from the buffer, (e) transporting the copies made from the buffer to an output tray to be collected as pre-collated sets while transporting the copies made not from the buffer to said buffer to replace the copies fed therefrom, and (f) making copies of said page images for a last set from odd numbered page images on the other side of copies fed from the buffer.

8. The method of claim 7 further comprising the preliminary steps of:

(a) copying the even numbered page images; and (b) interleaving these copies with odd numbered page images to form a full simplexed set of images arranged in sequentially numbered odd-even order.

9. A method for copying images from odd and even positioned documents onto both sides of copy sheets in a pre-collated order comprising the steps of:

(a) feeding said documents past an imaging station on a number of passes including a first, second and last pass, (b) imaging only the even positioned documents during said first and second of said number of passes, (c) feeding sheets from a first copy sheet source to receive said images on one side thereof, (d) directing said imaged copy sheets to a duplex stacking position, (e) feeding said documents past said imaging station on a third and subsequent number of passes, (f) imaging on said third and subsequent passes all of said documents, (g) feeding alternately on said third and subsequent passes copy sheets from said duplex position and from said copy sheet source to receive said images whereby sheets fed from said duplex position receives said images on the other side thereof and are conveyed to an output tray in order to form pre-collated sets and sheets fed from said copy sheet source receives said images and are conveyed to said duplex position to await feeding from said duplex position, (h) inhibiting said imaging during the last two passes of said documents over said imaging station so that only odd positioned documents are imaged and (i) copying the documents imaged on said last two passes over said imaging station only on sheets fed from said duplexing position.

10. A method of making duplex copy sets from a set of original documents arranged in odd-even order comprising the steps of:

(a) making copies of even-ordered documents in said set on one side thereof, (b) transporting said even ordered copies to a buffer, (c) making copies of all originals, (d) making copies on the other side of copies fed from the buffer while alternately making copies not fed from the buffer, (e) transporting the copies made from the buffer and collecting them into pre-collated sets in an output tray while transporting the copies made from the buffer to said buffer to replace the copies fed therefrom, and (g) making copies of said documents for a last set from odd-ordered documents on the other side of copies fed from the buffer.

11. A method of automatically reproducing on a reproduction machine from original documents multiple collated sets of two-sided copies having front and back sides comprising:

(a) reproducing from the original documents in collated fashion at least one set of back side information on copy substrates thereby making one-sided copies and feeding said substrates to a buffer storage means;

(b) then reproducing from the original documents in collated fashion at least one set of back and front side information, placing the back side information onto copy substrates thereby making additional one-sided copies and feeding said substrates to the buffer storage means while alternately placing the front side information onto the side of substrates fed from the buffer storage means in collated fashion thereby making two-sided copies and feeding said two-sided copies out of the reproduction machine; and (c) then reproducing in collated fashion at least one set of front side information of the original documents onto the front side of the one-sided copies remaining in the buffer storage means to make the final set of two-sided copies and feeding said two-sided copies out of the reproduction machine.

12. A method of automatically reproducing on a reproduction machine from original documents multiple collated sets of two-sided copies having front and back sides, said machine having at least one collated set of back side information on copy substrates in a buffer storage means;

(a) reproducing from the original documents in collated fashion at least one set of front and back side information, placing the back side information onto copy substrates thereby making additional one-sided copies and feeding said substrates to the buffer storage means while simultaneously placing the front side information onto the front side of substrate fed from the buffer storage means in collated fashion thereby making two-sided copies and feeding said two-sided copies out of the reproduction machine; and (b) then reproducing in collated fashion at least one set of front side information of the original documents onto the front side of the one-sided copies remaining in the buffer storage means to make the final set of two-sided copies and feeding said two-sided copies out of the reproduction machine.

13. A method of automatically reproducing on a reproduction machine from original documents multiple collated sets of two-sided copies having front and back sides comprising:

(a) maintaining at least one collated set of one-sided copy substrates in a buffer storage at least until the final set of two-sided copies is made;

(b) reproducing from the original documents in collated fashion at least one set of back and front side information, placing the back side information onto copy substrates thereby making additional one-sided copies and feeding said substrates to the buffer storage means and placing the front sided information onto the front side of substrates fed from the buffer storage means in collated fashion thereby making two-sided copies and feeding said two-sided copies out of the reproduction machine; and (c) then reproducing in collated fashion at least one set of front sided information of the original documents onto the front side of the one-sided copies remaining in the buffer storage means to make the final set of two-sided copies and feeding said two-sided copies out of the reproduction machine.

14. Apparatus providing pre-collated sets of sheets of page images comprising:

means for forming an image of the page images on a sheet of final support material;

means for serially presenting to said imaging means a plurality of page images, said page images being arranged in a desired sequential order wherein page images arranged at an odd position in said order comprise odd type page images and page images arranged at an even position in said order comprise even type page images;

first means for feeding first sheets of final support material from a first supply thereof;

second means for feeding second sheets of final support material from a second supply thereof; and means alternately responsive to the presentation of a page image of said odd type to said imaging means for actuating said first feeding means to feed a first sheet of final support material to said imaging means for forming an image of said odd type page image thereon and responsive to the presentation of a page image of said even type for actuating said second feeding means to feed a second sheet of final support material to said imaging means for forming an image thereon of said even type page images.

15. An apparatus as in claim 14, further including means for forwarding said first sheets after images have been formed on a first side thereof to said second feeding means in an arrangement whereby said first sheets may be fed to said imaging means to have an image formed on the opposing side thereof, said second sheets comprising said first sheets having an image on a first side thereof, whereby pre-collated duplexed sets of copy sheets are provided.

16. An apparatus for reproducing a pre-collated set of documents comprising:

means for forming an image of the document on a sheet of final support material;

means for serially presenting to said imaging means a plurality of documents, said documents being arranged in a desired sequential order wherein documents arranged at an odd position in said order comprise odd type documents and documents arranged at an even position in said order comprise even type documents;

first means for feeding first sheets of final support material from a first supply thereof;

second means for feeding second sheets of final support material from a second supply thereof; and means alternately responsive to the presentation of a document of one of said odd or even types to said imaging means for actuating said first feeding means to feed a first sheet of final support material to said imaging means for forming an image of said one type document thereon and responsive to the presentation of a document of the other of said odd or even types for actuating said second feeding means to feed a second sheet of final support material to said imaging means for forming an image thereon of said other type document.

17. An apparatus as in claim 16, further including means for forwarding said first sheets after images have been formed on a first side thereof to said second feeding means in an arrangement whereby said first sheets may be fed to said imaging means to have an image formed on the opposing side thereof, said second sheets comprising said first sheets having an image on a first side thereof, whereby pre-collated duplexed sets of copy sheets are provided.

18. In a duplex copying system in which page images are formed onto both sides of copy sheets in a pre-collated manner, by copy processor means forming page images on one side of a copy sheet, to form multiple pre-collated copy sheet sets, the improvement in said copying system comprising:

duplex buffer set means with an input side and an output side, said duplex buffer set means being adapted to store a set of said pre-collated copy sheet sets therein between said input side and said output side, said duplex buffer set means including means for receiving, at said input side of said duplex buffer set means, from said copy processor means, copy sheets on which a page image has been formed on only one side of said copy sheets, said duplex buffer set means further including means for feeding copy sheets back to said copy processor means from said output side of said duplex buffer set means for copying of another page image on the opposite side of said copy sheets by said copy processor means coincidentally with said receiving of copy sheets at said input side, thereby providing duplex copying of multiple copy sheet sets unlimited by the set storage capacity of said duplex buffer set means, and further including copy sheet supply means and means for alternately feeding copy sheets from said sheet supply means and said output side of said duplex buffer set means.

19. An improved duplex reproduction system for producing pre-collated duplex copy sets from original document page images including an imaging station for said documents and a processor for placing a document page image onto one side of a copy sheet, comprising:

(a) document page image feeding means for separately passing original document page images in seriatim to a copy station of said processor in a pre-selected number of passes including a first and last pass, (b) inhibiting means for not copying alternate document page images on first and last passes of said document page images by said document feeding means, (c) first copy sheet feeding means for feeding copy sheets into said processor on all but said last pass, (d) conveying means for receiving said copy sheets that have had images placed on one side thereof by said processor and transporting them with the other side thereof not imaged.

(e) duplex stacking means for receiving said copy sheets from said conveying means that have been alternately imaged from said first pass of said document page image feeding means to form a buffer set, (f) second copy sheet feeding means associated with said duplex stacking means for feeding one side image copy sheets from said buffer set, only after a second pass of said document page images by said document feeding means to said processor, to be imaged on said other side alternately with sheets being fed to the processor from said first copy sheet feeding means to be imaged on said one side, said sheets from said buffer being continued from said processor to a duplex output means after the other side is imaged in pre-collated order and said copy sheets from said copy sheet feeding means being continued from said processor to said duplex stacking means to replace said buffer set in said duplex stacking means, and (g) said inhibiting means including means to allow feeding of copy sheets on the last pass of said document page image feeding means only from said second copy sheet feeding means whereby said buffer set is imaged on said other side in order to complete the pre-collated sets.

20. A reproduction system for producing duplex copies from page images in pre-collated order comprising in combination:

(a) means to expose said page images in a predetermined routine;
(b) means for supplying copy sheets to receive on one side thereof images of said page images;
(c) buffer means for receiving said imaged copy sheets for storage; and
(d) selector means to select between said buffer means and said means for supplying copy sheets to be imaged whereby sheets fed from said buffer are alternately fed to be imaged on the other side thereof with sheets fed from said means for supplying copy sheets to be imaged on one side thereof, said sheet being imaged on the other side thereof are continued to an output tray duplexed in pre-collated order while said copy sheets that are fed from said means for supplying copy sheets are continued to the buffer means.

21. The reproduction system of claim 20 wherein copy sheets are fed only from said buffer means while making the last set of duplexed copy sheets.

22. An improved duplex reproduction system for producing pre-collated duplex copy sets from original document page images including an imaging station for said documents and a processor for placing a document page image onto one side of a copy sheet, comprising:
(a) document page image feeding means for separately passing original document page images in seriatim to a copy station of said processor in a preselected number of passes including at least a first and last pass,
(b) inhibiting means for not copying alternate document page images on first, second, next to last and last passes of said document page images by said document feeding means,
(c) first copy sheet feeding means for feeding copy sheets into said processor on all but said next to last and last passes,
(d) conveying means for receiving said copy sheets that have had images placed on one side thereof by said processor and transporting them with the other side thereof not imaged,
(e) duplex stacking means for receiving said copy sheets from said conveying means that have been alternately imaged from said first and second passes of said document page image feeding means to form first and second buffer sets,
(f) second copy sheet feeding means associated with said duplex stacking means for feeding one side imaged copy sheets from said first buffer set, only after said second pass of said document page images by said document feeding means to said processor, to be imaged on said other side alternately with sheets being fed to the processor from said first copy sheet feeding means to be imaged on said one side, said sheets from said first buffer set being continued from said processor to a duplex output means after the other side is imaged in pre-collated order and said copy sheets from said copy sheet feeding means being continued from said processor to said duplex stacking means to replace said first buffer set in said duplex stacking means, and
(g) said inhibiting means including means to allow feeding of copy sheets on the next to last and last passes of said document page image feeding means only from said second copy sheet feeding means whereby said first and second buffer sets are imaged on said other side in order to complete the pre-collated sets.

23. A method for copying images from page images in sequential odd and even numbered order onto both sides of copy sheets in a pre-collated order comprising the steps of:
(a) providing an imaging station;
(b) feeding said page images past said imaging station on a number of passes including at least a first and last pass;
(c) imaging only the even numbered page images during at least said first of said number of passes;
(d) feeding sheets from a first copy sheet source to receive said images on one side thereof;
(e) directing said imaged copy sheets to a duplex stacking position;
(f) feeding said page images past said imaging station on a subsequent number of passes;
(g) imaging on said subsequent number of passes all of said page images;
(h) feeding alternately on said subsequent number of passes copy sheets from said duplex position and from said copy sheet source to receive said images whereby sheets fed from said duplex position receive said images on the other side thereof and are conveyed to a tray to form pre-collated sets and sheets fed from said copy sheet source receive said images and are conveyed to said duplex position to await feeding from said duplex position;
(i) inhibiting said imaging during at least the last pass of said page images over said imaging station in order to image only odd numbered page images; and
(j) copying the documents imaged on at least said last pass over said imaging station only on sheets fed from said duplexing position.

* * * * *